(12) United States Patent
Song et al.

(10) Patent No.: US 7,085,636 B2
(45) Date of Patent: Aug. 1, 2006

(54) TRANSMISSIBILITY SHAPING CONTROL FOR ACTIVE VEHICLE SUSPENSION SYSTEMS

(75) Inventors: Xubin Song, Canton, MI (US); Jeremy R. Edmondson, Canton, MI (US); Carlos F. Osorio, Whitmore Lake, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/688,095

(22) Filed: Oct. 17, 2003

(65) Prior Publication Data

US 2005/0085970 A1   Apr. 21, 2005

(51) Int. Cl.
  *B60G 23/00* (2006.01)
  *B60G 17/016* (2006.01)
(52) U.S. Cl. ..................................... 701/38; 280/5.512
(58) Field of Classification Search ............ 701/37–38, 701/48; 280/5.5, 5.502, 5.506, 5.507, 5.508, 280/5.512
  See application file for complete search history.

(56) References Cited

U.S. PATENT DOCUMENTS

| | | | |
|---|---|---|---|
| 4,787,649 A | 11/1988 | Watanabe et al. | |
| 5,011,180 A | 4/1991 | Dunwoody | |
| 5,060,157 A | 10/1991 | Tado et al. | |
| 5,075,855 A * | 12/1991 | Sugasawa et al. | 701/37 |
| 5,101,355 A | 3/1992 | Wada et al. | |
| 5,218,546 A | 6/1993 | Bradshaw et al. | |
| 5,265,704 A | 11/1993 | Landesfeind | |
| 5,324,066 A | 6/1994 | Masamura et al. | |
| 5,338,058 A | 8/1994 | Ohtagaki et al. | |
| 5,377,107 A | 12/1994 | Shimizu et al. | |
| 5,390,948 A | 2/1995 | Kuriki et al. | |
| 5,400,245 A | 3/1995 | Butsuen et al. | |
| 5,432,700 A | 7/1995 | Hrovat et al. | |
| 5,444,621 A | 8/1995 | Matsunaga et al. | |
| 5,451,852 A | 9/1995 | Gusakov | |
| 5,475,593 A | 12/1995 | Townend | |
| 5,483,448 A | 1/1996 | Liubakka et al. | |
| 5,911,768 A * | 6/1999 | Sasaki | 701/38 |
| 6,000,702 A | 12/1999 | Streiter | |
| 6,175,792 B1 | 1/2001 | Jones et al. | |
| 6,202,011 B1 | 3/2001 | Jeon | |
| 6,314,353 B1 | 11/2001 | Ohsaku et al. | |
| 6,389,341 B1 | 5/2002 | Davis | |
| 6,412,788 B1 | 7/2002 | Ichimaru | |
| 6,434,460 B1 | 8/2002 | Uchino et al. | |
| 6,502,837 B1 | 1/2003 | Hamilton et al. | |
| 2002/0138186 A1 | 9/2002 | Kim | |
| 2002/0195789 A1 | 12/2002 | Coombs et al. | |

* cited by examiner

*Primary Examiner*—Thu V. Nguyen
(74) *Attorney, Agent, or Firm*—Brinks Hofer Gilson & Lione (57) ABSTRACT

The present invention provides a transmissibility shaping control for active suspension systems. The T-shaping control is a combination of several sub-strategies using the dynamic information in the frequency domain. Each strategy works dominantly in a certain frequency range to achieve a desirable transmissibility for better suspension performance in the corresponding frequency range. Different sub-strategies for different frequency ranges include stiffness control, skyhook control, groundhook control, and various damping levels. In addition, an embodiment is provided utilizing tunable compressible fluid struts in an active vehicle suspension.

11 Claims, 5 Drawing Sheets

TRANSMISSIBILITY SHAPING CONTROL FOR ACTIVE VEHICLE SUSPENSION SYSTEMS

BACKGROUND

1. Field of the Invention

The present invention generally relates to active vehicle suspension systems. More specifically, the invention relates to transmissibility shaping control for active vehicle suspension systems.

2. Description of Related Art

Generally, people all over the world drive their automobiles to various destinations. In order for these people to enjoy the ride to their destinations the suspensions systems in the automobiles must be stable and as comfortable as possible. Typically, different types of automobiles have various suspension systems, which control the ride and handling performance of the vehicle. For example, some vehicles may have a stiff suspension system that limits movement of its vehicle chassis with respect to the road wheels, but provides less isolation from rough road surfaces. In contrast to the stiff suspension system, some vehicles may have a soft suspension system that provides a more comfortable ride by isolating the vehicle occupied from the rough road surface, but allowing increased vehicle chassis movement causing a decrease in the handling performance.

These suspension systems also include various components, such as shock absorbers. Shock absorbers receive and take up shock that would normally be exerted on the wheels of the vehicle in order to improve the ride performance and the vibration of the wheels. The vibration of the wheels triggers the suspension system to vibrate in an uncontrollable manner. The suspension system vibrates at different frequencies, which may make the suspension system unstable and arduous to control. By adjusting damping with semiactive dampers, semiactive suspension system can improve ride performance, but provide limited improvement of vehicle handling.

Usually the dynamics related to vehicle suspension systems have a frequency range of up to 25 Hz, which includes two modes: vehicle body mode around 1 Hz and wheel hub mode around 11 Hz. Traditionally, the luxury vehicle suspension has soft suspension with the body mode frequency of less than 1 Hz, while sports vehicles have very stiff suspension with larger than 1 Hz body mode frequency for good handling. Generally passive suspensions are designed with a trade-off of ride comfort and handling.

Automotive OEMs and suppliers are working on active suspension systems to improve vehicle ride and handling performance. Typically active suspension systems employ hydraulic actuators and use control algorithms requiring force feedback. In addition, these systems may require up to 7.5 Kw during operation with a fully hydraulic active suspension system. The amount of power required is a significant disadvantage for implementation.

In view of the above, it is apparent that there exists a need for improved system and method for controlling active suspensions.

SUMMARY

In satisfying the above need, as well as overcoming the enumerated drawbacks and other limitations of the related art, the present invention provides a transmissibility shaping control for active suspension systems.

An embodiment of the present invention, described herein, a compressible fluid struts (CFS) including a digital displacement pump-motor (DDPM) is provided. The CFS is described as having continuously variable semi-active (CVSA) valves for damping tuning. However, the transmissibility shaping (T-shaping) control of the present invention is also applicable to vehicle suspension systems having a CFS without CVSA valves.

For an active vehicle suspension, it is possible to break the active forces into two tunable forces: one is the damping force from damping tuning and the other the elastic force related to the spring rate or stiffness. Therefore the suspension performance, which can be identified per the transmissibility shape in the frequency domain, is determined by these two tunable elements: damping and stiffness. The system tunes the damping and stiffness elements in combination with frequency information to improve the suspension performance. Studies have shown that the level of stiffness and damping can have significantly different effects on the suspension transmissibility in different frequency ranges. Therefore, separate control strategies are required for the different frequency ranges to reduce the effect of vibration on the wheel and/or body of the vehicle. In addition, for situations requiring improved handling, a stiff suspension can be provided by maximizing the stiffness and damping coefficients.

T-shaping control of the present invention uses the suspension travel measurement signals and vehicle body accelerations to improve vehicle ride and handling. Additional vehicle signals including lateral acceleration, steering wheel, gas pedal, brake pedal, and longitudinal velocity may also be utilized to identify the vehicle driving situations in order for controller to properly control the ride control, roll control and pitch (dive/squat) control.

Further aspects, features and advantages of this invention will become readily apparent to persons skilled in the art after a review of the following description, with reference to the drawings and claims that are appended to and form a part of this specification.

DETAILED DESCRIPTION

Figure 1:
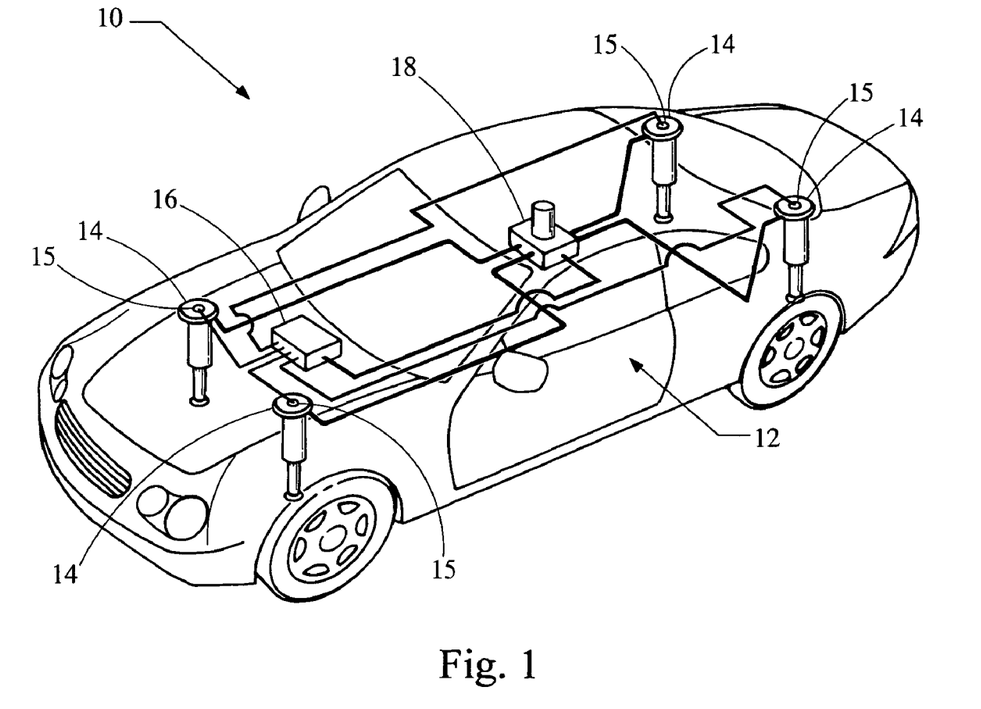
FIG. 1 is a diagrammatic view of an active suspension system using compressible fluid struts in accordance with the present invention.

Referring now to the drawings, in FIG. 1 a vehicle 10 is shown having an active suspension system 12 embodying the principles of the present invention. Active suspension system 12 includes an electronic control unit 16, a digital displacement pump-motor 18, compressible fluid struts 14, and sensors 15.

Electronic control unit 16 of the active suspension system 12 interfaces with sensors 15 and other vehicle subsystems to collect suspension travel, suspension travel velocity, and other relevant vehicle information, such as: steering angle, lateral acceleration, and longitudinal velocity to determine and implement a control strategy to optimize the suspension performance. The electronic control unit 16 utilizes the control strategy to operate DDPM 18 to tune the stiffness and damping characteristics of each compressible fluid strut 14.

Figure 2:
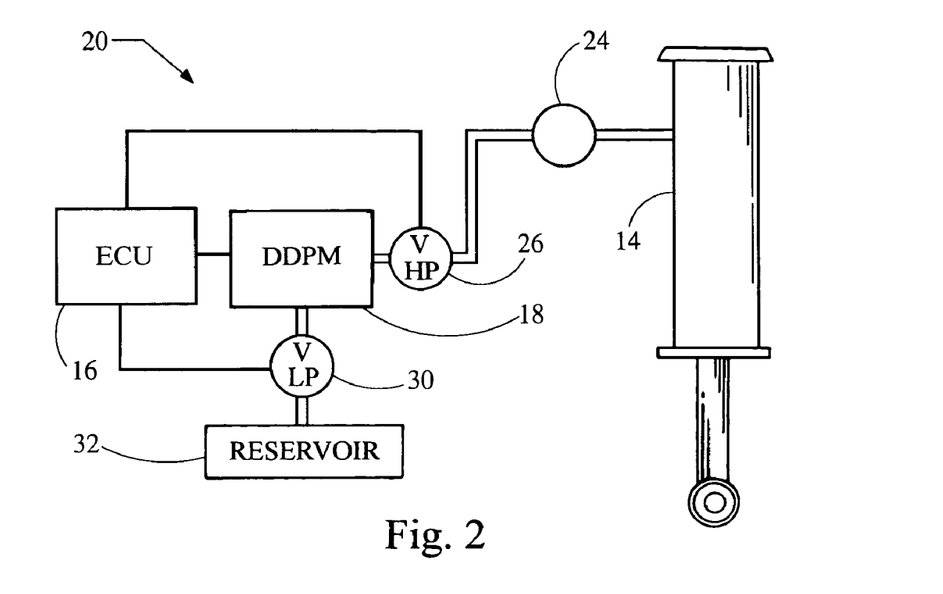
FIG. 2 is a diagrammatic view of a compressible fluid strut with a digital displacement pump motor in accordance with the present invention.

Now referring to FIG. 2. while a compressible fluid strut 14 for one corner of the vehicle is shown in further detail it is understood that a strut Is provided at each wheel. The electronic control unit 16 is connected to DDPM 18, high pressure valve 26, and the low pressure valve 30. The digital displacement pump motor 18 being In fluid communication with reservoir 32 through LP valve 30 and strut 14 through HP valve 26 can actively charge or discharge fluid from reservoir 32 to tune compressible fluid strut 14. An isolator 24 disposed between HP valve 26 and strut 14, Isolates the silicon gel contained in compressible fluid strut 14 from the non-compressible liquid contained in DDPM 18.

In a default state, high pressure valves 26 are closed and the low pressure valves 30 are open. Thus, for the default state, suspension system 12 is passive while DDPM 18 is idle. To increase the pressure in the compressible fluid strut 14 the high pressure valve 26 is in the default state while the low pressure valve 30 is actively closed. Conversely, to decrease the pressure, high pressure valve 26 is actively opened while low pressure valve 30 is actively closed.

With regard to suspension control systems, three basic factors should be considered: ride control, drive/squat control, and handling control. For the drive/squat and handling control, a stiff suspension is preferred. Thus, the preferred control strategy should tune the suspension system to have maximum stiffness and damping level thereby reducing the body roll angle and wheel-hop motions for improved handling.

The control strategy with respect to ride comfort is far more complex than the squat/drive control and handling control strategy. Per the suspension dynamic characteristics, two factors should be considered: primary and secondary ride. The primary ride concerns the body mode control while the secondary ride concerns the wheel-hop mode control.

Figure 3:
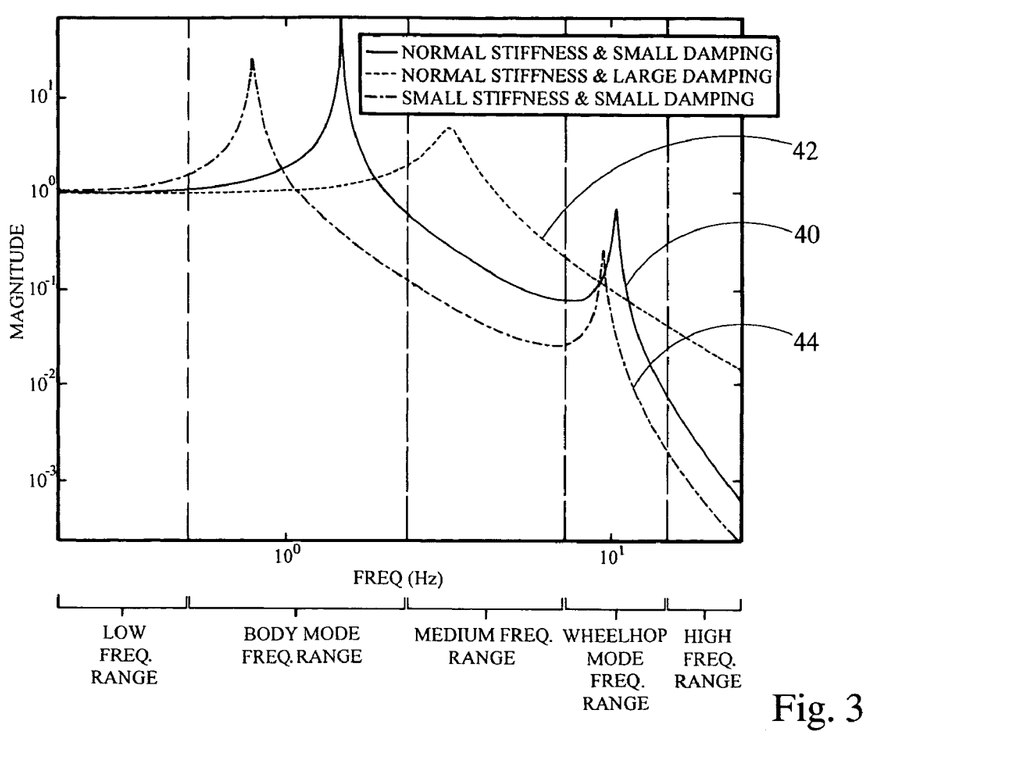
FIG. 3 is a plot of the sprung mass transmissibility illustrating the effect of stiffness and damping on vehicle dynamics.
Figure 4:
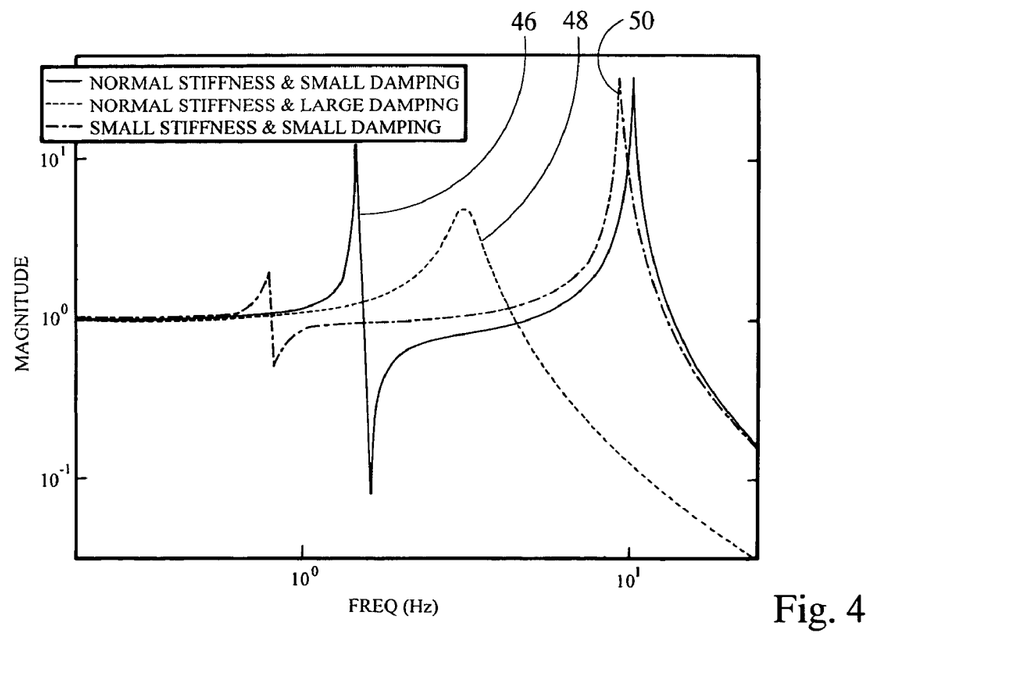
FIG. 4 is a plot of the tire transmissibility illustrating the effect of stiffness and damping on the vehicle dynamics.

Now referring to FIGS. 3 and 4, the transmissibility present in a Q-car (Quarter-car) model is shown to illustrate the vehicle ride dynamics. The sprung mass or vehicle transmissibility plot is shown in FIG. 3. Line 40 represents the sprung mass transmissibility for normal stiffness and small damping. Line 42 represents the sprung mass transmissibility for normal stiffness and large damping. Similarly, line 44 represents the sprung mass transmissibility for small stiffness and small damping. Different frequency ranges are defined according to the effect of stiffness and damping. There are five ranges: low frequency range, body mode frequency range, medium frequency range, wheel-hop mode frequency range, and high frequency range.

The unsprung mass or tire transmissibility is illustrated in FIG. 4. Line 46 represents the unsprung mass transmissibility for normal stiffness and small damping. Line 48 represents the unsprung mass transmissibility for normal stiffness and large damping. Likewise, line 50 represents the unsprung mass transmissibility for small stiffness and small damping. The unsprung mass transmissibility can also be divided into the five above mentioned frequency ranges. From the figures, it is clear that the transmissibility shape in different frequency ranges can be changed dramatically by varying stiffness and damping.

Table 1 lists the preferred control strategies for specific frequency ranges. The soft stiffness is not included beyond the body mode frequency range even though very effective, as shown in FIG. 3. The soft stiffness is not included because the stiffness control consumes a large amount of power in those frequency ranges. Therefore, the stiffness control is applied up to 3–5 Hz, which is referred to as a low-bandwidth active suspension control

TABLE 1

Control Strategy vs. Domain for T-Shaping Control

| | Frequency Range | Adopted Control Strategy |
|---|---|---|
| Ride Control (i.e., Ride Comfort) | Low | Passive Suspension (i.e., DDPM idle) or Stiff Suspension Strategy |
| | Body Mode | Small Stiffness (and Skyhook) |
| | Medium | Low Damping (and Skyhook) |
| | Wheel-hop | High Damping or Groundhook |
| | High | Low Damping |
| Roll Control (i.e., Handling Control) | | Large Stiffness with High Damping (i.e., Stiff Suspension Strategy) |
| Pitch Control (i.e., Dive/Squat Control) | | Large Stiffness with High Damping (i.e., Stiff Suspension Strategy) |

The control strategies of Table 1 are defined below:

Passive Suspension refers to the suspension when DDPM is idle in the context of this embodiment.

Soft Stiffness Control is the negative feedback of the measured relative displacement.

Large Stiffness Control is the positive feedback of the measured relative displacement.

Low Damping is the negative feedback of the relative velocity, which is either measured or estimated from the measured relative displacement.

High Damping is the positive feedback of the relative velocity, which is either measured or estimated from the measured relative displacement.

Ground Hook is the feedback based on the linear velocity of the unsprung mass.

Sky Hook is the feedback based on the bounce, pitch and roll velocity of the sprung mass.

Large stiffness with High damping also referred to as 'stiff suspension strategy', combines both large stiffness control and high damping.

The combination of control strategies for ride control is further described in U.S. patent application Ser. No. 10/422,603, filed Apr. 23, 2003, which is incorporated herein by reference. A low damping strategy should be sufficient for ride control if the compressible fluid strut has CVSA valves except in body mode and wheel-hop mode frequency ranges. Otherwise as a low bandwidth suspension system without CVSA the suspension should be passive except in the body mode frequency range. Fundamentally, a suspension using a compressible fluid strut with CVSA valves is considered a broad bandwidth active suspension system. Alternatively, a suspension system compressible fluid strut without CVSA valves is considered a low bandwidth active suspension system. The ride control for a broad bandwidth active suspension control can be expressed as equation (1):

$$RideControl = \frac{A_1}{\varepsilon + \sum_{i=1}^{5} A_i} \times PassiveSuspension +$$

$$\frac{A_2}{\varepsilon + \sum_{i=1}^{5} A_i} \times Soft\_StiffnessControl +$$

$$\frac{A_2}{\varepsilon + \sum_{i=1}^{5} A_i} \times SkyhookControl + \frac{A_3}{\varepsilon + \sum_{i=1}^{5} A_i} \times LowDamping +$$

$$\frac{A_4}{\varepsilon + \sum_{i=1}^{5} A_i} \times (HighDamping \text{ or } Groundhook) +$$

$$\frac{A_5}{\varepsilon + \sum_{i=1}^{5} A_i} \times LowDamping$$

(1)

where $A_i$ are estimated amplitudes of the pitch acceleration for the corresponding frequency ranges, wherein $A_1$ corresponds to low frequency range, $A_2$ corresponds to the body mode frequency range, $A_3$ corresponds to the medium frequency range, $A_4$ corresponds to the wheel hop frequency range, and $A_5$ corresponds to the high frequency range, and $\varepsilon$ is a small number selected to avoid singularity.

The broad bandwidth active suspension control can also be implemented using fuzzy logic. For low bandwidth active suspension, only the first three frequency ranges are considered shown below as equation (2).

$$RideControl = \frac{A_1}{\varepsilon + \sum_{i=1}^{3} A_i} \times PassiveSuspension +$$

$$\frac{A_2}{\varepsilon + \sum_{i=1}^{3} A_i} \times Soft\_StiffnessControl +$$

$$\frac{A_2}{\varepsilon + \sum_{i=1}^{3} A_i} \times SkyhookControl + \frac{A_3}{\varepsilon + \sum_{i=1}^{3} A_i} \times LowDamping$$

(2)

Figure 5:
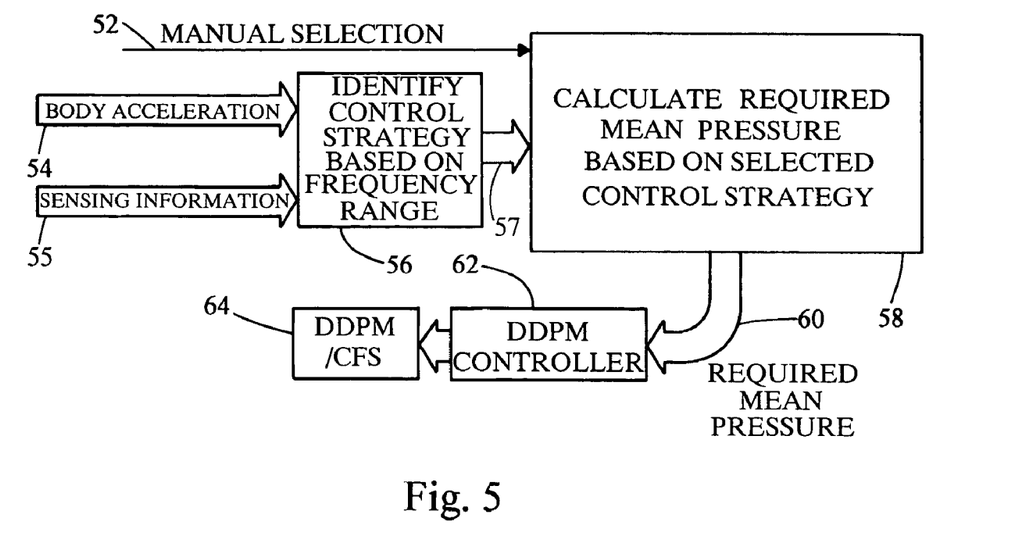
FIG. 5 is a diagrammatic view of the transmissibility shaping control configured to control a digital displacement pump motor and compressible fluid strut based active suspension system in accordance with the present invention.

FIG. 5 shows an embodiment of the control structure for the T-shaping control in accordance with an embodiment of the present invention. Three body accelerations 54 are provided to block 56 which identifies a preferred control strategy based on the frequency range. The three body accelerations 54 need to be converted to bounce, pitch, and roll accelerations. Eq. (1) is applied using the bounce, pitch, and roll accelerations to produce a bounce ride control, a pitch ride control, and a roll ride control, respectively. Then the total ride control 57 can be derived according to the relationship shown below as equation (3).

$$TotalRideControl = \alpha_1 \times BounceRideControl + \\ \alpha_2 \times PitchRideControl + \alpha_3 \times RollRideControl$$

(3)

where $60_i$ (i=1 to 3) based on the frequency of vibration and the summation of $A_i$ is equal to 1. The present invention further contemplates that the three body accelerations can be replaced with one body acceleration and two angular accelerations measured by gyros or rate sensors.

In another aspect of the invention, controller also uses additional sensing information 55 such as steering wheel angle, lateral acceleration, yaw rate, longitudinal velocity, brake pedal and gas pedal to determine which control strategy to employ, as shown in FIG. 5.

The total ride control 57 is then provided to block 58 where the required mean pressure 60 is calculated based on the selected control strategy. Alternatively, the driver of the vehicle may also manually select the control strategy through a manual selection signal 52. Similar to the ride control strategy, other formulations can be used to combine ride control, handling control and dive/squat control by applying techniques such as fuzzy logic or a weighting approach. The combination of the ride, handling, and dive/squat control strategies to produce the required mean pressure 60 in the compressible fluid struts 64 can be described by the following relationship:

$$RequiredMeanPressure = \beta_1 \times TotalRideControl + \\ \beta_2 \times HandlingControl + \beta_3 \times DiveSquatControl$$

(4)

Where $\beta_1$ (i=1 to 3) is the coefficients decided by the vehicle status, and summation of $\beta_1$ is 1. The required mean pressure for each strut will be calculated relative to the suspension travel and vehicle velocity. The required mean pressure signal 60 then is sent to the DDPM controller 62, which can control pumping, motoring, or idling for each cylinder corresponding to each of the compressible fluid struts 64. This closed-loop control dynamically adjusts the suspension transmissibility for desired performance.

Figure 6:
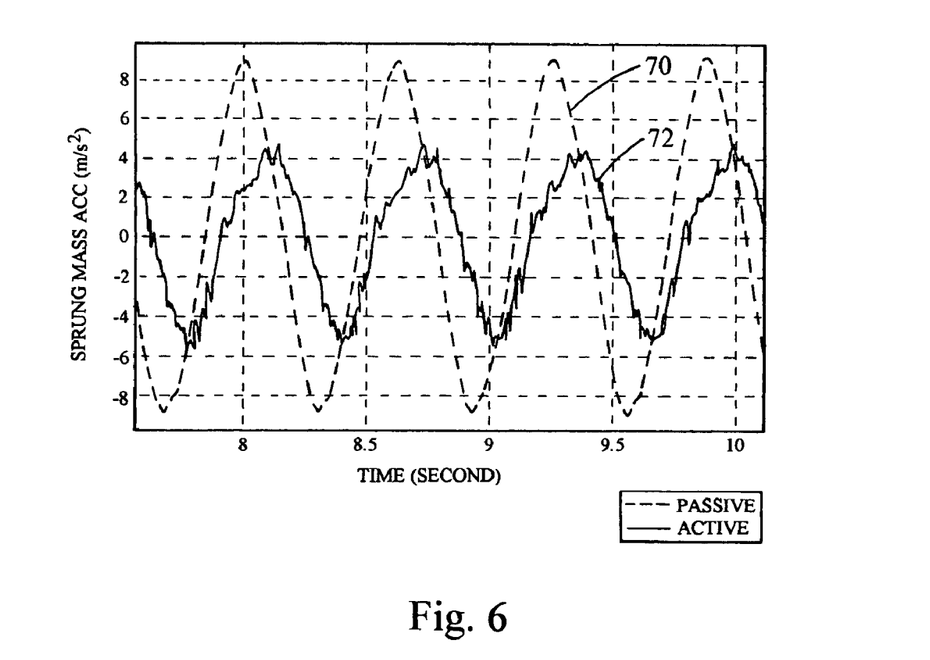
FIG. 6 is a plot of the sprung mass acceleration due to pure tone vibration for an active and passive suspension system.
Figure 7:
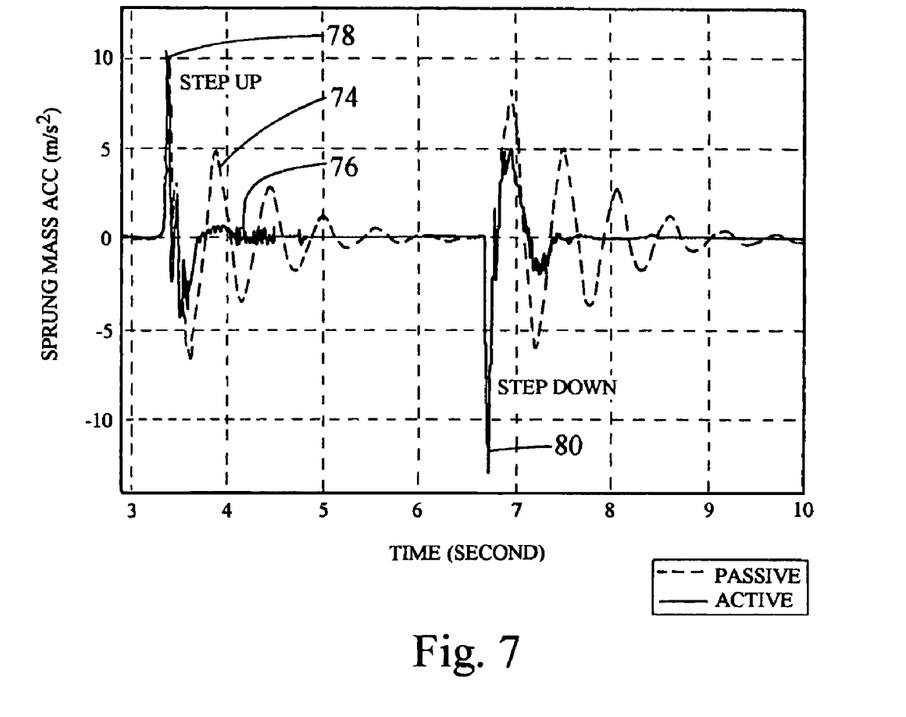
FIG. 7 is a plot of the sprung mass accelerations due to discrete events for an active and passive suspension system.
Figure 8A:
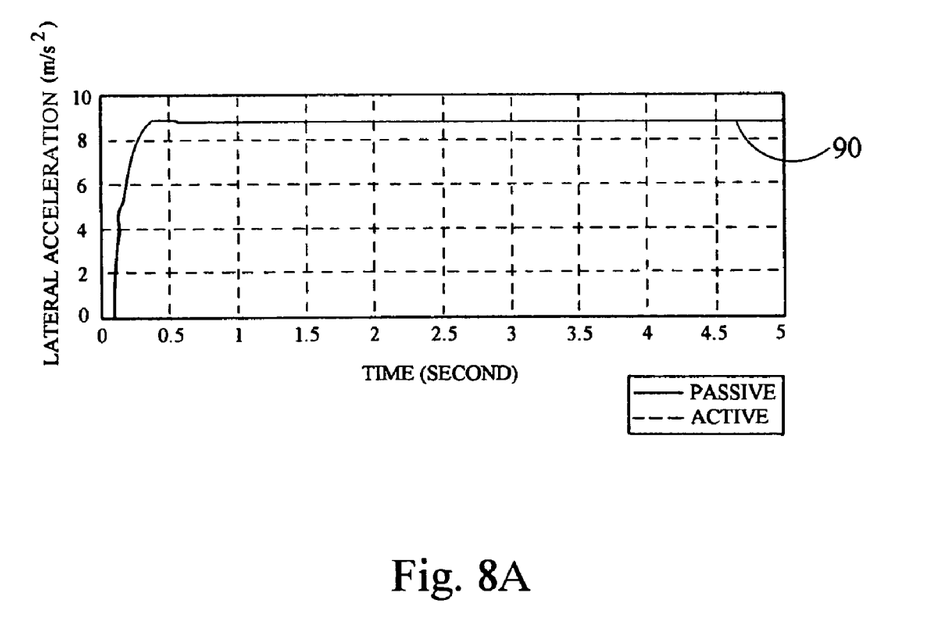
FIG. 8a is a plot of the lateral acceleration during a constant radius maneuver.
Figure 8B:
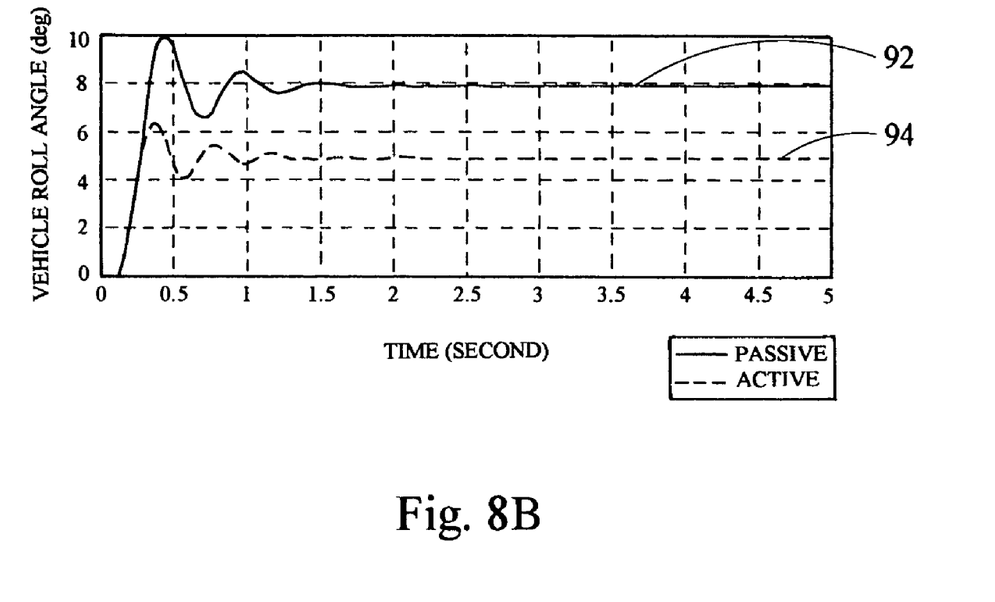
FIG. 8b is a plot of the vehicle roll angle for an active and passive suspension system during a constant radius maneuver.

FIG. 6 shows the sprung mass accelerations by exposing the vehicle to pure-tone vibrations. Line 70 represents the sprung mass accelerations due to pure tone vibration on a passive suspension. Alternatively, line 72 represents the sprung mass accelerations on an active suspension controlled according to the present invention. FIG. 7 shows the sprung mass acceleration resulting from discrete events. Reference numeral 78 indicates a step up event while reference numeral 80 indicates a step down event. The sprung mass accelerations for a passive system are represented by line 74 while the sprung mass accelerations for an active system are represented by line 76. In FIGS. 6 and 7, the comparison between active and passive suspensions clearly shows that the active suspension with T-shaping control can significantly improve the primary ride. FIGS. 8a and 8b represent the results of a handling simulation illustrating the roll dynamics while the vehicle performs a constant radius maneuver. The lateral acceleration of the vehicle during the constant radius maneuver is represented by line 90. Line 94 represents the vehicle roll angle of an active suspension system controlled according to the present invention corresponding to the lateral acceleration during the constant radius maneuver. Alternatively, line 92 represents the roll angle of passive suspension system corresponding to the same lateral acceleration. FIG. 8b shows that the roll angle can be reduced by almost half with the active suspension control strategies of the present invention, while the vehicle has a lateral acceleration of 1 g. Furthermore, the amount of oscillation is also reduced with the active suspension.

While the T-shaping control described above is for active vehicle suspensions implementing compressible fluid struts, this control strategy can be applied to other active suspensions. Since the T-shaping control is based on tuning stiffness and damping, the suspension transmissibility can be properly altered for the desired dynamic performance including soft, stiff or in-between suspensions.

More importantly because damping coefficient and stiffness of each damper are explicitly tuned, their ranges can be properly determined based on the hardware conditions so that negative values can be avoided. Thus, the T-shaping control can avoid system destabilization for active suspension, while exploiting the maximum hardware capability.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A system for controlling an active suspension of a vehicle, having a bounce transmissibility, a roll transmissibility, and a pitch transmissibility, where the bounce, pitch, and roll transmissibilities vary with respect to a frequency of vibration acting upon the vehicle, the system comprising:

a tunable device configured for adjusting stiffness and damping of the active suspension;

a controller in communication with the tunable device, the controller being configured to sense the frequencies of vibration and provide a control signal to the tunable device, wherein the control signal is based on a bounce component, a roll component, and a pitch component dependent on the bounce, pitch, and roll transmissibility at the sensed frequency, wherein the control signal includes a ride control component, a handling control component, and a dive/squat control component;

wherein the controller includes a plurality of control strategies corresponding to a plurality of frequency ranges, and the control signal is based on a control strategy of the plurality of control strategies corresponding to a frequency range of the plurality of frequency ranges that includes the frequency of vibration;

wherein the plurality of control strategies includes a passive suspension control strategy, a small stiffness and skyhook control strategy, a low damping control strategy, a high damping control strategy and stiff suspension strategy; and wherein the bounce control component Is based on the relationship $$BounceControlComponent = $$
$$\frac{A_1}{\varepsilon + \sum_{i=1}^{5} Ai} \times PassiveSuspension + \frac{A_2}{\varepsilon + \sum_{i=1}^{5} Ai} \times Soft\_StiffnessControl + $$
$$\frac{A_2}{\varepsilon + \sum_{i=1}^{5} Ai} \times SkyhookControl + \frac{A_3}{\varepsilon + \sum_{i=1}^{5} Ai} \times LowDamping + $$
$$\frac{A_4}{\varepsilon + \sum_{i=1}^{5} Ai} \times HighDamping + \frac{A_5}{\varepsilon + \sum_{i=1}^{5} Ai} \times LowDamping$$

where $A_1$ are estimated amplitudes of the bounce acceleration for the corresponding frequency ranges, wherein $A_1$ corresponds to the low frequency range, $A_2$ corresponds to the body mode frequency range, $A_3$ corresponds to the medium frequency range, $A_4$ corresponds to the wheel hop frequency range, and $A_5$ corresponds to the high frequency range, and $\varepsilon$ is a small number selected to avoid singularity.

2. The system according to claim 1, wherein the control signal is based on the relationship $$ControlSignal = $$
$$\beta_1 \times TotalRideControl + \beta_2 \times HandlingControl + \beta_3 \times DiveSquatControl$$

where $\beta_1$ are coefficients calculated based on the frequency of vibration and a summation of $\beta_1$ is 1.

3. The system according to claim 1, wherein the ride control component includes a bounce control component, a roll control component, and a pitch control component.

4. The system according to claim 3, wherein the ride control is based on the relationship $$RideControl = $$
$$\alpha_1 \times BounceRideControl + \alpha_2 \times PitchRideControl + \alpha_3 \times RollRideControl$$

where $\alpha_i$ are coefficients calculated based on the frequency of vibration and a summation of $\alpha_i$ is 1.

5. The system according to claim 1, wherein the plurality of frequency ranges includes a low frequency range, a body mode frequency range, a medium frequency range, a wheel hop frequency range, and a high frequency range.

6. A system for controlling an active suspension of a vehicle, having a bounce transmissibility, a roll transmissibility, and a pitch transmissibility, where the bounce, pitch, and roll transmissibilities vary with respect to a frequency vibration acting upon the vehicle, the system comprising:

a tunable device configured for adjusting stiffness and damping of the active suspension;

a controller in communication with the tunable device, the controller being configured to sense the frequencies of vibration and provide a control signal to the tunable device, wherein the control signal is based on a bounce, pitch, and roll component, and a pitch component dependent on the bounce, pitch, and roll transmissibility at the sensed frequency, wherein the control signal includes a ride control component, a handling control component, and a dive/squat control component;

wherein the controller includes a plurality of control strategies corresponding to a plurality of frequency ranges, and the control signal is based on a control strategy of the plurality of control strategies corresponding to a frequency range of the plurality of frequency ranges that includes the frequency of vibration;

wherein the plurality of control strategies includes a passive suspension control strategy, a small stiffness and skyhook control strategy, a low damping control strategy, a high damping control strategy and stiff suspension strategy; and wherein the pitch control component is based on the relationship $$PitchControlComponent =$$
$$\frac{A_1}{\varepsilon + \sum_{i=1}^{5} Ai} \times PassiveSuspension + \frac{A_2}{\varepsilon + \sum_{i=1}^{5} Ai} \times Soft\_StiffnessControl +$$
$$\frac{A_2}{\varepsilon + \sum_{i=1}^{5} Ai} \times SkyhookControl + \frac{A_3}{\varepsilon + \sum_{i=1}^{5} Ai} \times LowDamping +$$
$$\frac{A_4}{\varepsilon + \sum_{i=1}^{5} Ai} \times HighDamping + \frac{A_5}{\varepsilon + \sum_{i=1}^{5} Ai} \times LowDamping$$

where $A_1$ are estimated amplitudes of the pitch acceleration for the corresponding frequency ranges, wherein $A_1$ corresponds to the low frequency, range, $A_2$ corresponds to the body mode frequency range, As corresponds to the medium frequency range, $A_4$ corresponds to the wheel hop frequency range, and $A_5$ corresponds to the high frequency range, and $\epsilon$ is a small number selected to avoid singularity.

7. A system for controlling an active suspension of a vehicle, having a bounce transmissibility, a roll transmissibility, and a pitch transmissibility, where the bounce, pitch, and roll transmissibilities vary with respect to a frequency of vibration acting upon the vehicle, the system comprising:

a tunable device configured for adjusting stiffness and damping of the active suspension;

a controller in communication with the tunable device, the controller being configured to sense the frequencies of vibration and provide a control signal to the tunable device, wherein the control signal is based on a bounce component, a roll component, and a pitch component dependent on the bounce, pitch, and roll transmissibility at the sensed frequencies, wherein the control signal includes a ride control component, a handling control component, and a dive/squat control component;

wherein the controller Includes a plurality of control strategies corresponding to a plurality of frequency ranges, and the control signal is based on a control strategy of the plurality of control strategies corresponding frequency range of the plurality of frequency ranges that includes the frequency of vibration;

wherein the plurality of control strategies Includes a passive suspension control strategy, a small stiffness and skyhook control strategy, a low damping control strategy, a high damping control strategy and stiff suspension strategy; and wherein the roll control component is based on the relationship $$RollControlComponent =$$
$$\frac{A_1}{\varepsilon + \sum_{i=1}^{5} Ai} \times PassiveSuspension + \frac{A_2}{\varepsilon + \sum_{i=1}^{5} Ai} \times Soft\_StiffnessControl +$$
$$\frac{A_2}{\varepsilon + \sum_{i=1}^{5} Ai} \times SkyhookControl + \frac{A_3}{\varepsilon + \sum_{i=1}^{5} Ai} \times LowDamping +$$
$$\frac{A_4}{\varepsilon + \sum_{i=1}^{5} Ai} \times HighDamping + \frac{A_5}{\varepsilon + \sum_{i=1}^{5} Ai} \times LowDamping$$

where $A_1$ are estimated amplitudes of thin roll acceleration for the corresponding frequency ranges, wherein $A_1$ corresponds to the low frequency range, $A_2$ corresponds to the body made frequency range, $A_3$ corresponds to he medium frequency range, $A_4$ corresponds to the wheel hop frequency range, and $A_5$ corresponds to the high frequency range, and $\epsilon$ is a small number selected to avoid singularity.

8. A system for controlling an active suspension of a vehicle, having a bounce transmissibility, a roll transmissibility, and a pitch transmissibility, where the bounce, pitch, and roll transmissibilities vary with respect to a frequency of vibration acting upon the vehicle, the system comprising:

a tunable device configured for adjusting stiffness and damping of the active suspension;

a controller in communication with the tunable device, the controller being configured to sense the frequencies of vibration and provide a control signal to the tunable device, wherein the control signal is based on a bounce component, a roll component, and a pitch component dependent on the bounce, pitch, and roll transmissibility at the sensed frequency wherein the controller includes a plurality of control strategies corresponding to a plurality of frequency ranges, and the control signal is based on a control strategy of the plurality of control strategies corresponding to a frequency range of the plurality of frequency ranges that includes the frequency of vibration;

wherein the plurality of frequency ranges includes a low frequency range, a body mode frequency range, a medium frequency range, a wheel hop frequency range, and a high frequency range; and wherein the bounce control component is based on the relationship $$BounceControlComponent = \frac{A_1}{s + \sum_{i=1}^{5} Ai} \times PassiveSuspension +$$
$$\frac{A_2}{\varepsilon + \sum_{i=1}^{5} Ai} \times Soft\_StiffnessControl +$$

-continued $$\frac{A_2}{\varepsilon + \sum_{i=1}^{5} Ai} \times SkyhookControl +$$

$$\frac{A_3}{\varepsilon + \sum_{i=1}^{5} Ai} \times LowDamping +$$

$$\frac{A_4}{\varepsilon + \sum_{i=1}^{5} Ai} \times HighDamping +$$

$$\frac{A_5}{\varepsilon + \sum_{i=1}^{5} Ai} \times LowDamping$$

where $A_1$ are estimated amplitudes of the bounce acceleration for the corresponding frequency ranges, wherein $A_1$ corresponds to the low frequency range, $A_2$ corresponds to the body mode frequency range, As corresponds to the medium frequency range, $A_4$ corresponds to the wheel hop frequency range, and $A_5$ corresponds to the high frequency range, and $\varepsilon$ is a small number selected to avoid singularity.

9. The system according to claim 8, wherein the plurality of control strategies includes a passive suspension control strategy, a small stiffness and skyhook control strategy, a low damping control strategy, a high damping control strategy and stiff suspension strategy.

10. A system for controlling an active suspension of a vehicle, having a bounce transmissibility, a roll transmissibility, and a pitch transmissibility, where the bounce, pitch, and roll transmissibilities vary with respect to a vibration acting upon the vehicle, the system comprising:
a tunable device configured for adjusting stiffness and damping of the active suspension;
a controller in communication with the tunable device, the controller being configured to sense the frequencies of vibration and provide a control signal to the tunable device, wherein the control signal is based on a bounce component, a roll component, and a pitch component dependent on the bounce, pitch, and roll transmissibility at the sensed frequency wherein this controller includes a plurality of control strategies corresponding to a plurality of frequency ranges, and the control signal is based on a control strategy of the plurality of control strategies corresponding to a frequency range of the plurality or frequency ranges that includes the frequency of vibration;
wherein the plurality of frequency ranges Includes a low range, a body mode frequency range, a medium frequency range, a wheel hop frequency range, and a high frequency range; and
wherein the pitch control component is based on the relationship $$PitchControlComponent = \frac{A_1}{\varepsilon + \sum_{i=1}^{5} Ai} \times PassiveSuspension +$$

$$\frac{A_2}{\varepsilon + \sum_{i=1}^{5} Ai} \times Soft\_StiffnessControl +$$

-continued $$\frac{A_2}{\varepsilon + \sum_{i=1}^{5} Ai} \times SkyhookControl +$$

$$\frac{A_3}{\varepsilon + \sum_{i=1}^{5} Ai} \times LowDamping +$$

$$\frac{A_4}{\varepsilon + \sum_{i=1}^{5} Ai} \times HighDamping +$$

$$\frac{A_5}{\varepsilon + \sum_{i=1}^{5} Ai} \times LowDamping$$

where $A_1$ are estimated amplitudes of the pitch acceleration for the corresponding frequency ranges, wherein $A_1$ corresponds to the low frequency range, $A_2$ corresponds to the body mode frequency range, $A_3$ corresponds to the medium frequency range, $A_4$ corresponds to the wheel hop frequency range, and $A_5$ corresponds to the high frequency range, and $\varepsilon$ is a small number selected to avoid singularity.

11. A system for controlling an active suspension of a vehicle, having a bounce transmissibility, a roll transmissibility, and a pitch transmissibility, where the bounce, pitch, and roll transmissibilities vary with respect to a frequency of vibration acting upon the vehicle, the system comprising:
a tunable device configured for adjusting stiffness and damping of the active suspension;
a controller in communication with the tunable device, the controller being configured to sense the frequencies of vibration and provide a control signal to the tunable device, wherein the control signal is based on a bounce component, a roll component, and a pitch component dependent on the bounce, pitch, and roll transmissibility at the sensed frequency wherein the controller includes a plurality of control strategies corresponding to a plurality of frequency ranges, and the control signal is based on a control strategy of the plurality of control strategies corresponding to a frequency range of the plurality of frequency ranges that includes the frequency of vibration;
wherein the plurality of frequency ranges includes a low frequency range, a body mode frequency range, a medium frequency range, a wheel hop frequency range, and a high frequency range; and
wherein the roll control component is based on the relationship $$RollControlComponent = \frac{A_1}{s + \sum_{i=1}^{5} Ai} \times PassiveSuspension +$$

$$\frac{A_2}{\varepsilon + \sum_{i=1}^{5} Ai} \times Soft\_StiffnessControl +$$

$$\frac{A_2}{\varepsilon + \sum_{i=1}^{5} Ai} \times SkyhookControl +$$

$$\frac{A_3}{\varepsilon + \sum_{i=1}^{5} Ai} \times LowDamping +$$

-continued $$\frac{A_4}{\varepsilon + \sum_{i=1}^{5} Ai} \times HighDamping +$$

$$\frac{A_5}{\varepsilon + \sum_{i=1}^{5} Ai} \times LowDamping$$

where $A_1$ are estimated amplitudes of the roll acceleration for the corresponding frequency ranges, wherein $A_1$ corresponds to the low frequency range, A2 corresponds to the body mode frequency range, A3 corresponds to the medium frequency range, $A_4$ corresponds to the wheel hop frequency range, and $A_5$ corresponds to the high frequency range, and $\epsilon$ is a small number selected to avoid singularity.

* * * * *